(12) United States Patent
Chai et al.

(10) Patent No.: US 10,988,013 B2
(45) Date of Patent: Apr. 27, 2021

(54) ELECTRIC DRIVE SYSTEM FOR MOTOR VEHICLE AND MOTOR VEHICLE USING SAME

(71) Applicant: NIO (ANHUI) HOLDING CO., LTD., Hefei (CN)

(72) Inventors: Xu Chai, Shanghai (CN); Chendong Huang, Shanghai (CN); Bin He, Shanghai (CN); Hongyu Lan, Shanghai (CN); Mengyang Liu, Shanghai (CN); Yibin Ren, Shanghai (CN); Bozhi Liang, Shanghai (CN); Shaobiao Chai, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 503 days.

(21) Appl. No.: 15/764,060

(22) PCT Filed: Sep. 26, 2016

(86) PCT No.: PCT/CN2016/100068
§ 371 (c)(1),
(2) Date: Mar. 28, 2018

(87) PCT Pub. No.: WO2017/054687
PCT Pub. Date: Apr. 6, 2017

(65) Prior Publication Data
US 2018/0290530 A1   Oct. 11, 2018

(30) Foreign Application Priority Data

Sep. 28, 2015   (CN) .......................... 201510629084

(51) Int. Cl.
*H02K 11/33*   (2016.01)
*B60K 1/00*   (2006.01)
(Continued)

(52) U.S. Cl.
CPC ................ *B60K 1/00* (2013.01); *B60K 17/04* (2013.01); *H02K 5/225* (2013.01); *H02K 7/003* (2013.01);
(Continued)

(58) Field of Classification Search
CPC .......... B60K 1/00; B60K 17/04; H02K 11/33; H02K 5/22; H02K 7/00; H02K 7/116
See application file for complete search history.

(56) References Cited

U.S. PATENT DOCUMENTS 9,252,641 B2 * 2/2016 Ishizuka ................ H02K 7/116
10,523,091 B2 * 12/2019 Takeuchi ............... H02K 11/02
(Continued)

FOREIGN PATENT DOCUMENTS

CN    103250322    8/2013
CN    203460685    3/2014
(Continued)

OTHER PUBLICATIONS

International Search Report prepared by the State Intellectual Property Office of the P.R. China dated Dec. 1, 2016, for International Application No. PCT/CN2016/100068.

*Primary Examiner* — Tran N Nguyen
*Assistant Examiner* — Leda T Pham
(74) *Attorney, Agent, or Firm* — Sheridan Ross P.C.

(57) ABSTRACT

Provided are an electric drive system for a motor vehicle and a motor vehicle using the electric drive system. The electric drive system for a motor vehicle comprises: an inverter unit (100) configured to convert externally-supplied DC power to AC power; an electric motor unit (300) configured to convert the power from the inverter unit (100) into mechanical rotation and output the mechanical rotation from an output shaft (303); and a gearbox unit (200) configured to decelerate the rotation transmitted from an input shaft (202)

(Continued)

and output the decelerated rotation. The electric motor unit (300), the gearbox unit (200) and the inverter unit (100) have respective independent enclosures. The electric motor unit (300), the gearbox unit (200) and the inverter unit (100) are detachably and mutually connected in an axial direction along the input shaft (202) of the gearbox unit (200) with the gearbox unit (200) positioned in between. The enclosure of the inverter unit (100) has the minimum thickness in the axial direction.

11 Claims, 5 Drawing Sheets

(51) Int. Cl.
*B60K 17/04* (2006.01)
*H02K 5/22* (2006.01)
*H02K 7/00* (2006.01)
*H02K 7/116* (2006.01)
*B60L 50/51* (2019.01)

(52) U.S. Cl.
CPC ............. *H02K 7/006* (2013.01); *H02K 7/116* (2013.01); *H02K 11/33* (2016.01); *B60L 50/51* (2019.02); *B60L 2210/40* (2013.01); *B60L 2220/12* (2013.01); *B60L 2260/28* (2013.01); *H02K 2211/03* (2013.01)

(56) References Cited

U.S. PATENT DOCUMENTS

| | | | |
|---|---|---|---|
| 2012/0153718 | A1 | 6/2012 | Rawlinson et al. |
| 2015/0083505 | A1* | 3/2015 | Pearce, Jr. ............. B60L 53/14 180/65.1 |
| 2015/0224884 | A1* | 8/2015 | Rawlinson .......... B60L 11/1803 180/65.31 |

FOREIGN PATENT DOCUMENTS

| | | |
|---|---|---|
| CN | 104626953 | 5/2015 |
| CN | 204361930 | 5/2015 |
| CN | 204451974 | 7/2015 |
| CN | 105216598 | 1/2016 |
| CN | 204998322 | 1/2016 |
| DE | 102013204766 | 9/2014 |
| EP | 1093958 | 4/2001 |
| JP | 2015-054612 | 3/2015 |

* cited by examiner

ELECTRIC DRIVE SYSTEM FOR MOTOR VEHICLE AND MOTOR VEHICLE USING SAME

CROSS REFERENCE TO RELATED APPLICATIONS

This application is a national stage application under 35 U.S.C. 371 and claims the benefit of PCT Application No. PCT/CN2016/100068 having an international filing date of 26 Sep. 2016, which designated the United States, which PCT application claimed the benefit of China Patent Application No. 201510629084.X filed 28 Sep. 2015, the disclosure of each of which are incorporated herein by reference.

FIELD OF THE INVENTION

The invention relates to an electric drive system for motor vehicle, and in particular to a compact electric drive system for motor vehicle which uses an electric motor as a power output source, or for a hybrid electric vehicle.

BACKGROUND OF THE INVENTION

Due to the use of electrical energy as their power sources, electric vehicles or hybrid electric vehicles have significant advantages in terms of emission reduction, energy saving or the like, as compared with conventional vehicles which solely use gasoline or diesel oil as power source. Therefore, in the current age of promoting green environment protection, the electric vehicles or hybrid electric vehicles are gradually becoming the trend of development in vehicle industry.

In the above drive systems using electrical energy as power source, an alternating current (AC) electric motor (hereinafter referred to as an electric motor) is typically used as a power output source, from the viewpoints of cost, structural complexity, maintenance convenience, and work efficiency. However, an energy storage system (a battery pack or the like) in an electric vehicle or a hybrid electric vehicle outputs a direct current (DC). Therefore, in order to drive the AC electric motor, it is required to arrange an inverter between the energy storage system and the AC electric motor for converting the DC power into AC power and supply it to the electric motor. The electric motor operates by using the AC power supplied from the inverter as a power source. An output shaft of the electric motor is connected to a gearbox, and the rotation of the output shaft is provided to the wheels after being decelerated by the gearbox so that the wheels can rotate.

In order to ensure the output power of the inverter and the electric motor, their dimensions have to be increased. This will lead to an increase of the overall space occupied by the drive system, and conflicts with the requirement of ensuring the passenger space in the vehicle as much as possible. In particular, at the positions where the rear wheels of the vehicle are located, since there is no space like the front engine compartment for arranging a large-sized electric drive system, such an electric drive system cannot be configured for rear-wheel driving, and the principle and arrangement of the drive system have to be designed otherwise, causing an increase of the cost.

In Patent Document 1, a compact electric drive system arranged transversely is disclosed, which has an inverter, a gearbox, and an electric motor that are linearly arranged side by side in the direction of an input shaft of the gearbox, thereby reducing a longitudinal height of the electric drive system and saving a longitudinal space occupied by the electric drive system.

[Patent Document 1] U59030063 (B2)

SUMMARY OF THE INVENTION

However, in the invention described in Patent Document 1, when the inverter, the gearbox and the electric motor are arranged transversely, a transverse dimension of the electric drive system becomes too large, and the requirement on the space for mounting vehicle axles cannot be met in terms of space arrangement. In particular, for the rear axles for which the mounting space is more limited, the electric drive system cannot be used for rear-wheel driving, so a set of drive or power transmission system for driving rear wheels is required to be additionally developed and designed, thus leading to an increase of cost in design, manufacture, maintenance or the like.

In addition, in the invention described in Patent Document 1, the electric drive system is integrated into one piece and is enclosed in a single enclosure, which results in that the inverter, the gearbox and the electric motor cannot be tested, or repaired, or replaced separately when the electric drive system is to be tested offline or to be maintained at a later stage, resulting in an increase of cost in test and maintenance.

The present application is developed in view of the above problems existing in the prior art, and an object of the present application is to provide an electric drive system for vehicle, which has a transverse size that is further reduced. In addition, another object of the present application is to provide an electric drive system for vehicle, which is both compact in structure and easy to test and repair. In addition, further another object of the present application is to provide an electric drive system for vehicle, which improves the insulation protection of the electrical connection between an inverter unit and an electric motor unit. It should be noted herein that, the above objects are merely examples of the technical effects of the present application, and there is no need to achieve all these objects simultaneously by the application.

An electric drive system for vehicle according to a technical solution of the present application includes: an inverter unit for converting DC power supplied from outside into AC power; an electric motor unit for converting the AC power from the inverter unit into a mechanical rotation and outputting the mechanical rotation from an output shaft; and a gearbox unit for decelerating the rotation transmitted from an input shaft and then outputting the decelerated rotation. The electric motor unit, the gearbox unit and the inverter unit have independent enclosures respectively, and are fixedly connected to each other in a detachable manner in such a way that the gearbox unit is sandwiched by the electric motor unit and the inverter unit in an axial direction of the input shaft of the gearbox unit. The enclosure of the inverter unit has a minimum thickness in the axial direction.

The inverter unit may include one or more layers of inverter circuit boards, and the inverter circuit boards are arranged with their circuit board surfaces substantially perpendicular to the axial direction.

The enclosure of the inverter unit may be of the shape of a box which has a bottom face shape matching with a projection shape of an outer contour of each of the circuit boards inside the enclosure.

A partition plate may be provided in the gearbox unit for partitioning the interior of the gearbox unit into a gear transmission cavity and a dry cavity for insertion of electric connection lines of the electric motor unit and the inverter unit; and the dry cavity may include a docking area for docking of the electric connection lines of the electric motor unit and the inverter unit.

The electrical connection lines may have multiple groups of connection wires; an insulation block may be provided in the docking area, and the insulation block may be provided with insulation grids for insulating and isolating the groups of connection wires of the electric connection lines.

The electrical connection lines may be bus bars; a bus bar of the electric motor unit and a bus bar of the inverter unit may be stacked vertically at the docking area, and are connected to each other in a detachable manner.

The output shaft of the electric motor unit may be a hollow shaft having internal splines, and the input shaft of the gearbox unit is a shaft extending from the enclosure of the gearbox unit and having external splines at a front end; the input shaft of the gearbox unit is inserted into the output shaft of the electric motor unit, and its external splines are cooperatively coupled with the internal splines of the output shaft of the electric motor unit so that the input shaft of the gearbox unit rotates with the rotation of the output shaft of the electric motor unit.

Another solution of the present application is a vehicle which uses above described electric drive system for vehicle as a drive system for front wheels.

The vehicle may also use another set of the same above described electric drive system for vehicle as a drive system for rear wheels.

DETAILED DESCRIPTION OF THE EMBODIMENTS

In the following, embodiments of the present invention will be described in detail based on the accompanying drawings. Identical or equivalent constituent elements are denoted by identical reference signs in the drawings, and a description thereof is appropriately omitted.

Figure 1:
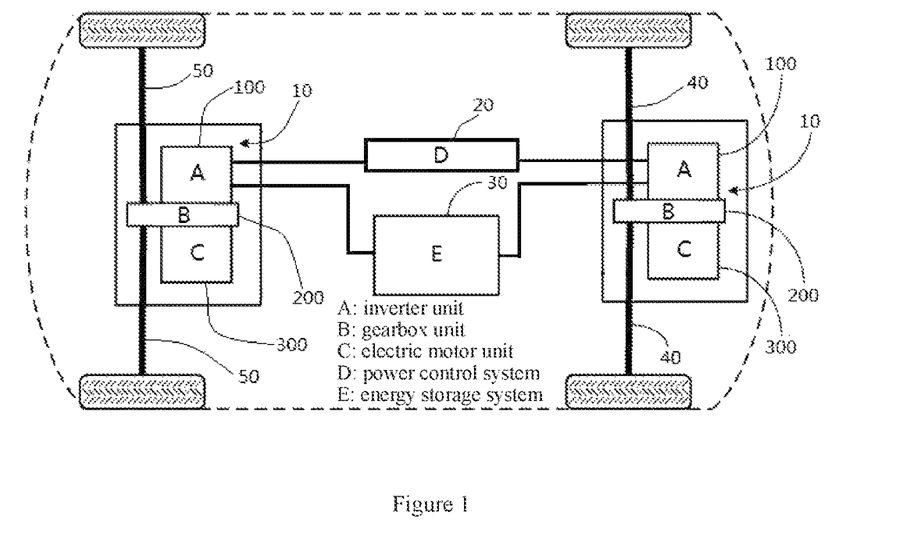
FIG. 1 is a view schematically illustrating an electric drive system according to an embodiment of the present invention that is equipped in an electric vehicle, and related systems thereof.

FIG. 1 is a view schematically illustrating an electric drive system according to the present invention that is equipped in an electric vehicle, and related systems thereof. In FIG. 1, the electric vehicle is taken as an example to show the arrangement of the electric drive system according to the present embodiments and related systems thereof, and the representations of other systems required by the electric vehicle are omitted. As shown in FIG. 1, an electric vehicle according to an embodiment of the present invention includes an electric drive system 10, a power control system 20, an energy storage system 30, front wheel half-axles 40, and rear wheel half-axles 50. The electric drive system 10 includes an inverter unit 100, a gearbox unit 200, and an electric motor unit 300 serving as an AC electric motor. The inverter unit 100 receives DC power from the energy storage system 30 (which may be an on-board energy storage power source or a battery pack such as a fuel battery power source, etc.) so as to convert the DC power into AC power under the power control of the power control system 20 and provide the AC power to the electric motor unit 300. A rotor in the electric motor unit 300 is rotated under the action of the magnetic field generated by AC power so as to convert the electrical energy into a mechanical rotation force, and the rotation force is output to the gearbox unit 200 through an output shaft. The rotation is decelerated through a cooperation of individual gear mechanisms in the gearbox unit 200 and is output to the half-axles of the wheels (front wheel half-axles 40 and rear wheel half-axles 50) after being adjusted by differential gears, thereby driving the wheels to rotate.

Figure 2:
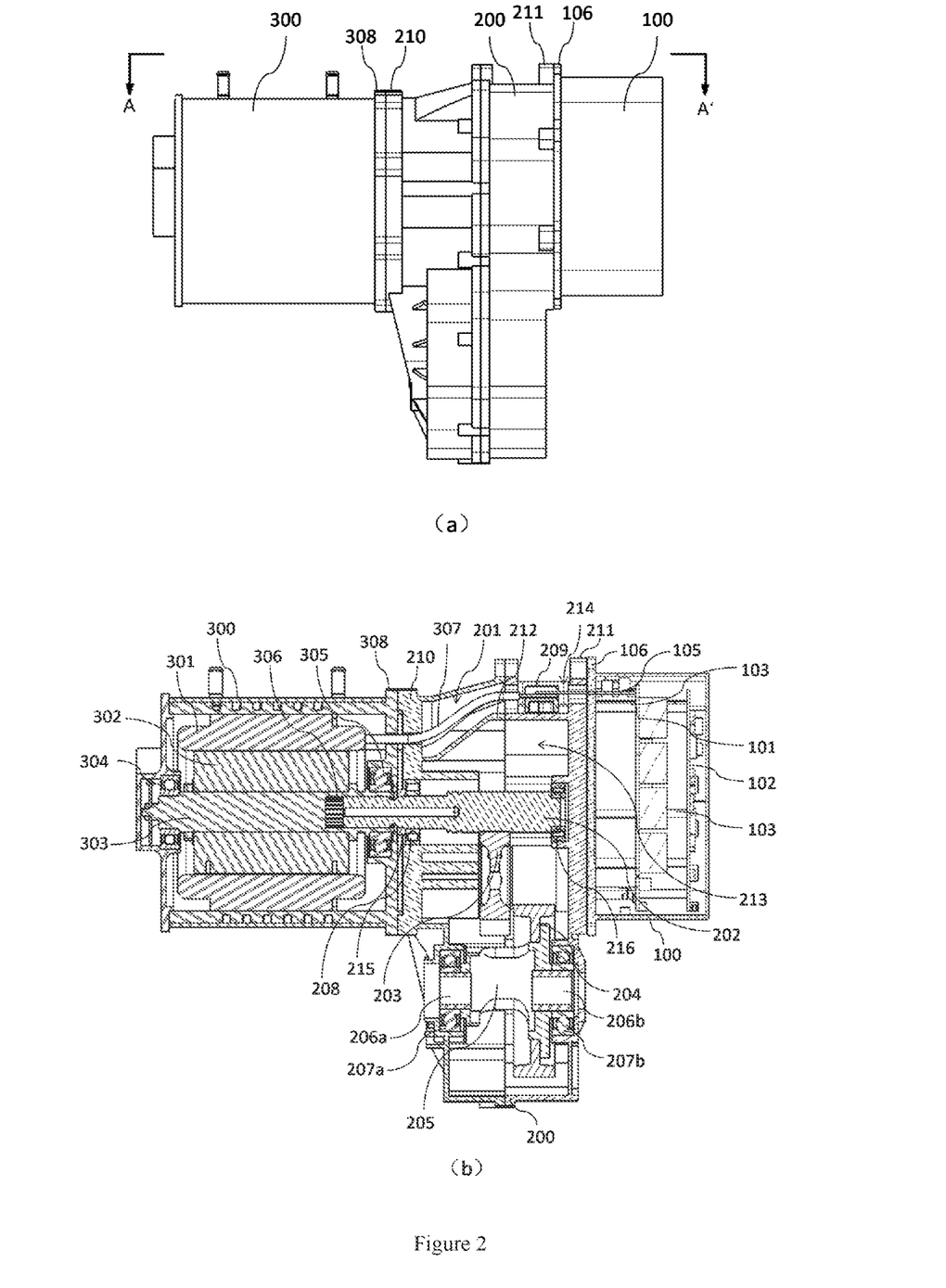
FIG. 2 is a view illustrating the electric drive system according to an embodiment of the present invention, in which (a) of FIG. 2 is a front view schematically illustrating an appearance of the electric drive system after being assembled; and (b) of FIG. 2 is a longitudinal sectional view schematically illustrating the electric drive system after being assembled.

FIG. 2 is a view illustrating the electric drive system according to an embodiment of the present invention, in which (a) of FIG. 2 is a front view schematically illustrating an appearance of the electric drive system after being assembled; and (b) of FIG. 2 is a longitudinal sectional view schematically illustrating the electric drive system after being assembled. Structural features of the electric drive system according to this embodiment is specifically described hereinafter with reference to FIG. 2.

As shown in (a) and (b) of FIG. 2, the electric motor unit 300, the gearbox unit 200 and the inverter unit 100 have respective independent enclosures, and they constitute independent units respectively. The electric motor unit 300, the gearbox unit 200, and the inverter unit 100 are transversely arranged in a straight line in the direction of an input shaft 202 of the gearbox unit 200 (which is also the direction of an output shaft 303 of the electric motor unit 300, hereinafter abbreviated as axial direction). A flange connection surface 309 on the output shaft side of the electric motor unit 300 is detachably connected to a flange connection surface of an enclosure 210 on the electric motor side of the gearbox unit 200 through bolts, and a flange connection surface of an enclosure 211 on the inverter side of the gearbox unit 200 is detachably connected to a flange connection surface 106 of the inverter unit 100 through bolts.

It should be noted that in this embodiment, the electric motor unit 300, the gearbox unit 200 and the inverter unit 100 are mechanically connected to each other in a detachable manner through bolt connection. However, other detachable mechanical or non-mechanical connection methods such as snap-fit connection, hinge connection or the like may also be used, and the connection surfaces may not be flange surfaces as required. Accordingly, the electric motor unit 300, the gearbox unit 200 and the inverter unit 100 may be conveniently detached and mounted respectively as an entirety, which facilitates test, maintenance and repair of individual units.

(b) of FIG. 2 schematically illustrates main internal configurations of the electric motor unit 300, the gearbox unit 200 and the inverter unit 100 respectively. In addition, illustrations of a cooling system and specific electronic circuit of the respective units are omitted in FIG. 2.

(Electric Motor Unit)

As shown in (b) of FIG. 2, the electric motor unit 300 includes a stator 301 fixed relative to the enclosure, a rotor 302 rotated under the effect of a magnetic field generated by energizing the stator 301, the output shaft 303 which is fixed relative to the rotor 302 and rotates integrally with the rotor 302, two sets of bearings 304 and 305 rotatably bearing the output shaft 303 respectively at two ends of the output shaft 303, and bus bars 307 electrically connected to the stator 301 for supplying power to the electric motor unit 300. The output shaft 303 is a hollow shaft, and internal splines 306 for mating with external splines of the input shaft of the gearbox unit 200 are provided at an inner side of the hollow shaft.

(Gearbox Unit)

As shown in (b) of FIG. 2, a cavity defined by the enclosure 210 on the electric motor side and the enclosure 211 on the inverter side of the gearbox unit 200 is partitioned by a partition plate 212 inside the cavity into a dry cavity 201 at an upper side of the drawing and a sealed gear transmission cavity 213 at a lower side of the drawing. No lubricating oil is filled in the dry cavity 201, and bus bar holes for insertion of the bus bars 307 of the electric motor unit 300 are formed in an end face, close to the electric motor unit 300 side, of the dry cavity 201. In addition, above the partition plate 212, a groove structure opening upwardly in the drawing is formed on the enclosure 211 on the inverter side, and becomes a docking area 214 where the bus bars 307 of the electric motor unit 300 dock with bus bars 105 of the inverter unit 100. On the flange connection surface of the enclosure 211 on the inverter side of the gearbox unit 200, which is connected with the inverter unit 100, a region corresponding to the docking area 214 is formed with a bus bar hole for insertion of bus bars 105 of the inverter unit 100. In addition, an insulation block 209 is fixed in the docking area 214, and the bus bars 307 and the bus bars 105 arriving at the docking area 214 by insertion through the individual bus bar holes are overlapped vertically on the insulation block 209, and are fixed by bolts which pass through bolt holes provided for docking at the overlapping positions of the bus bars 307 and the bus bars 105 respectively. In this way, the bus bars 307 of the electric motor unit 300 are electrically connected with the bus bars 105 of the inverter unit 100, and are fixed relative to the enclosure 211 on the inverter side of the gearbox unit 200. The specific configuration of the insulation block 209 will be described later in detail.

Provided in the gear transmission cavity 213 of the gearbox unit 200 are: an input shaft 202 extending outwards from the enclosure 210 on the electric motor side of the gearbox unit 200 and having external splines at a front end for mating with internal splines of the output shaft of the electric motor unit 300; two sets of bearings 215 and 216 rotatably supporting the input shaft 202; a pinion 203 meshing with the input shaft 202 and rotating with the rotation of the input shaft 202; a large gear 204 meshing with the pinion 203 and rotating with the rotation of the pinion 203; a differential gear set 205 mating with the large gear 204; output half axles 206a and 206b serving as output of the differential gear set 205; and bearings 207a and 207b rotatably supporting the output half axles 206a and 206b respectively. Lubricating oil is filled in the gear transmission cavity 213 so as to lubricate the gear sets for rotation. In order to prevent the lubricating oil from leaking, an oil seal member 216 is provided at a portion, protruding out from the enclosure 210 on the electric motor side of the gearbox unit 200, of the input shaft 202.

Since the lubricating oil is to be filled in the gear transmission cavity of the gearbox unit 200, the function of the oil seal member 216 for preventing the lubricating oil from leaking is of particular importance. If such a configuration is used in which the input shaft of the gearbox unit 200 is the hollow shaft having internal splines and the output shaft of the electric motor is inserted into the gearbox unit 200 and coupled by the splines, the lubricating oil seal member 216 may be damaged or have a shortened service life due to numerous times of insertion and pulling out or the like of the splined output shaft of the electric motor in a test or maintenance process at a later stage. However, no lubricating oil or the like is filled in the electric motor unit 300, and therefore no oil seal member is required. Thus, with this embodiment having a configuration in which the input shaft 202 of the gearbox unit 200 is a shaft extending out of the gearbox and having external splines and the output shaft of the electric motor unit 300 is a hollow shaft having internal splines, a situation of damage or service life reduction of the oil seal member of the gearbox unit 200 in a test or maintenance process at a later stage can be alleviated, thus allowing a mating level of the oil seal member 216 and the input shaft 202 to be maintained at a level when they are just removed off the production line.

In addition, in this embodiment, for ease of description, the gearbox unit 200 is described by taking a single-speed gearbox with a fixed teeth ratio as an example; of course, a multi-speed gearbox or the like may also be used.

(Insulation Block)

Figure 3:
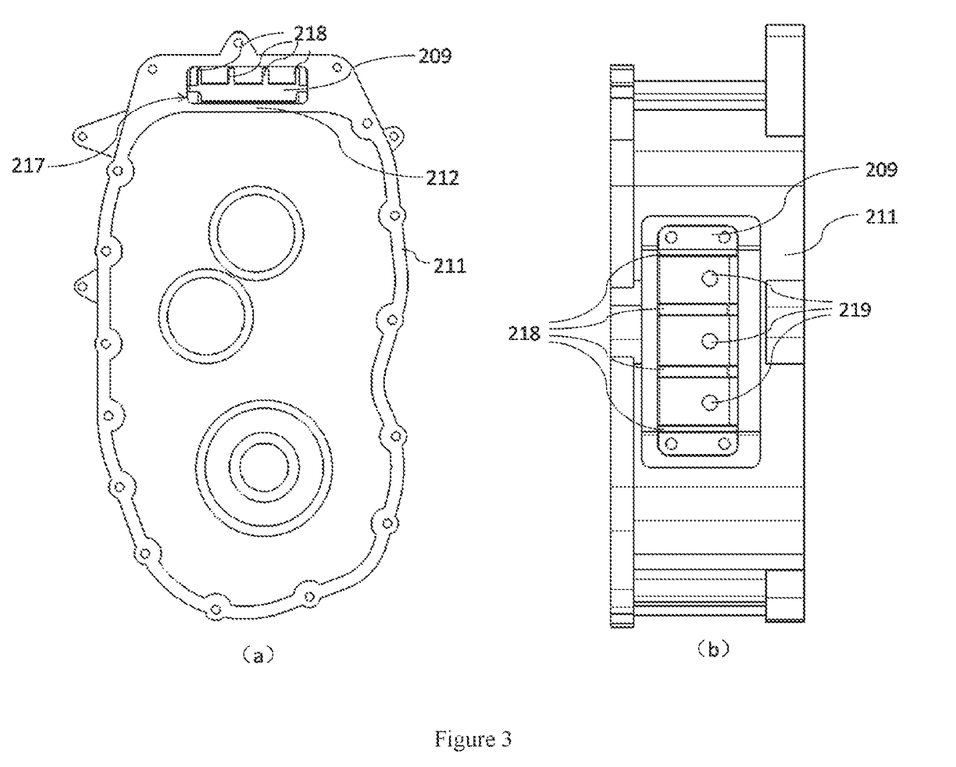
FIG. 3 is a view schematically illustrating the configuration of an insulation block according to an embodiment of the present invention, and a mounting position thereof, wherein (a) and (b) of FIG. 3 are respectively a left side view and a top view for illustrating the enclosure on the inverter side of the gearbox unit shown in (a) of FIG. 2 and the insulation block assembled in the docking area thereof.

FIG. 3 is a view schematically illustrating the configuration of the insulation block 209, and a mounting position thereof, wherein (a) and (b) of FIG. 3 are respectively a left side view and a top view for illustrating the enclosure 211 on the inverter side of the gearbox unit 200 shown in (a) of FIG. 2 and the insulation block 209 assembled in the docking area 214 thereof.

As shown in (a) of FIG. 3, a window 217 is formed above the partition plate 212 of the enclosure 211 on the inverter side of the gearbox unit 200 for the bus bars 307 of the electric motor unit 300 and the bus bars 105 of the inverter unit 100 to pass. That is, the window 217 axially extends through the enclosure 211 on the inverter side of the gearbox unit 200. A groove space enclosed by the window 217 and the partition plate 212 constitutes a docking area 214 for the bus bars 307 of the electric motor unit 300 and the bus bars 105 of the inverter unit 100. The insulation block 209 is arranged in the docking area 214, and the insulation block 209 is fixed to the enclosure 211 on the inverter side through bolt connection. The insulation block 209 may be made of various inorganic, organic or hybrid insulating materials, as long as they have the insulation performance required by the design.

As shown in (a) of FIG. 3, the insulation block 209 is provided with insulation grids 218 protruding upward and extending in a running direction of the bus bars. In this embodiment, the electric motor unit 300 and the inverter unit 100 are each provided with three bus bars made of cooper or other conductive materials for docking with each other, so the insulation block 209 is provided with a total of four insulation grids 218, and a docking space for the bus bar 307 and bus bars 105 to overlap with each other is formed between adjacent insulation grids 218.

As shown in (b) of FIG. 3, a bolt hole 219 for fixing the bus bar 307 and the bus bar 105 by a bolt is provided at each of the docking spaces. In a practical assembling, the bus bars 307 and the corresponding bus bars 105 are overlapped vertically in corresponding docking spaces of the insulation block so that the bolt holes of the bus bars and the bolt holes of the corresponding docking spaces are vertically aligned co-axially, and a bolt is used to pass through the aligned bus bars 307 and 105 and is fixed to the bolt hole of the corresponding docking space so that the three components can be fixed relative to each other. Alternatively, the bolt hole of the insulation block 209 may be a through hole, and a blind bolt hole may be provided at a corresponding position of the enclosure 211 on the inverter side to allow the bolt to pass through the aligned bus bars 307 and 105 and the bolt hole in the docking space, and then be fixed in the corresponding blind bolt hole of the enclosure 211 on the inverter side, so that the bus bar 307, the bus bar 105, the insulation block 209 and the enclosure 211 on the inverter side can be fixed relative to each other.

In the techniques disclosed in Patent Document 1, the inverter and the electric motor are also electrically connected by bus bars, and each of the bus bars is made of a conductive material having a length of 12 m, a width of 2 cm and a thickness of 0.5 cm for ensuring its rigidity. Unlike this, in this embodiment, since the insulation block 209 is further provided at the docking area of the bus bars 307 of the electric motor unit 300 and the bus bars 105 of the inverter unit 100, the insulation grids 218 of the insulation block 209 can function as insulation members for three individual sets of parallel extending bus bars, and meanwhile the docking spaces formed between the insulation grids 218 further function as bearing members for bearing the bus bars. Therefore, as compared with the techniques disclosed in Patent Document 1, in the present embodiments, the requirements on rigidity of the bus bars can be reduced, the material cost can be saved, and a situation can be also effectively prevented in which short circuit between the bus bars occurs due to loosening of the bolts for docking the bus bars caused by bumps or the like during a long term use and a major fault of the electric drive system is caused accordingly.

In addition, in the above description, the fixing of the bus bars to the insulation block and/or the gearbox enclosure is described by taking the bolt connection as an example. The connection is not limited to the bolt connection, and it may also be snap-fit connection, hinge connection and other detachable mechanical or non-mechanical connection methods. Thereby, the various components can be conveniently detached and mounted, which facilitates the test, maintenance, and repair of the components.

(Inverter Unit)

The arrangement of the inverter unit according to this embodiment and its internal printed circuit boards is described below. In the invention, the inverter is a direct current/alternating current (DC/AC) power converter, which is used for converting the DC power supplied by the energy storage system 30 into an AC power required for driving the electric motor unit 300 (AC electric motor). In the embodiment, the inverter unit 300 may be an active inverter, a passive inverter and high performance DC/AC power converters in various different combinations.

Figure 4:
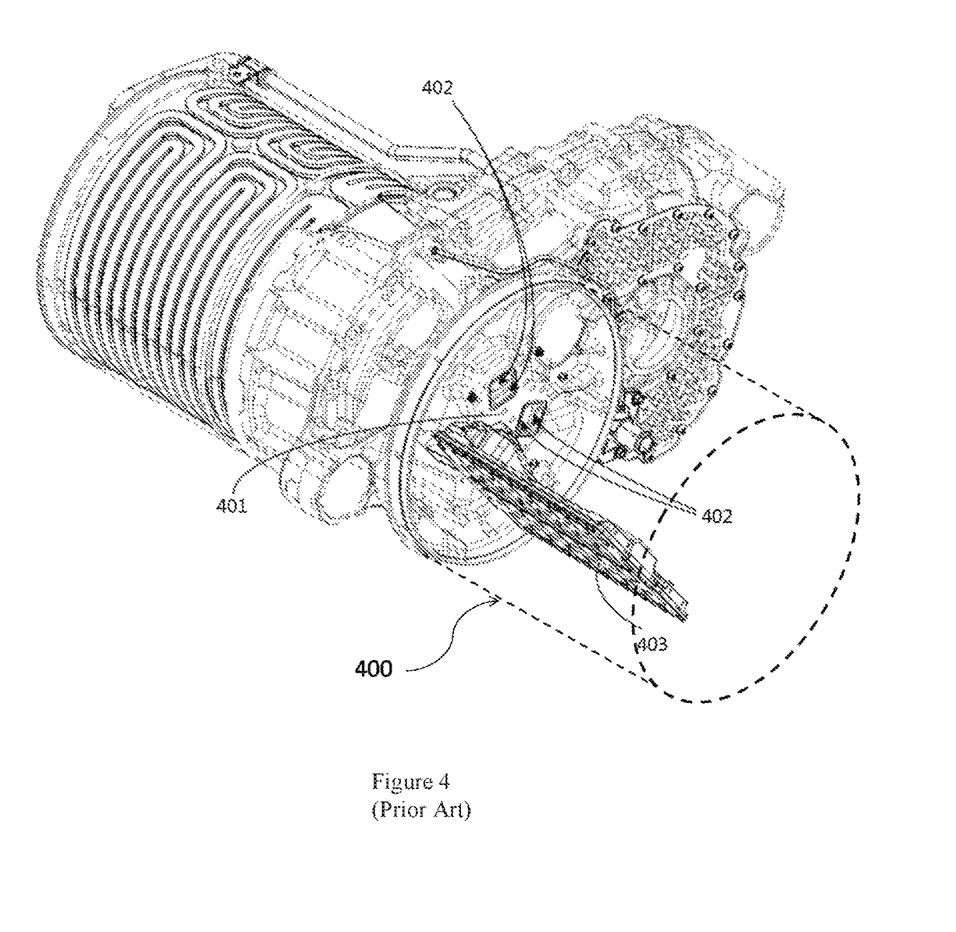
FIG. 4 is a view illustrating mounting a PCB of an internal circuit of the inverter disclosed by Patent Document 1 which serves as a comparative example.

Before describing the arrangement of the PCBs of the inverter circuit in the enclosure of the inverter unit 100 according to this embodiment and other related elements, firstly, the arrangement of the PCBs of the internal circuit of the inverter in Patent Document 1 as a comparative example and its related elements is described briefly with reference to FIG. 4. FIG. 4 corresponds to FIG. 8 of Patent Document 1, and illustrates the mounting of the PCBs of the internal circuit of the inverter. In FIG. 4, a dotted box 400 schematically indicates the enclosure of its inverter, reference numeral 401 indicates a mounting base of the PCBs of the inverter circuit, reference numeral 402 indicates the mounting interface of the PCBs of the inverter circuit, and reference numeral 403 indicates the PCBs of the inverter circuit. It is to be noted that, in the techniques disclosed in Patent Document 1, the inverter circuit has a total of three PCBs, and only one of the three PCBs 403 is shown in FIG. 4. The three PCBs 403 are respectively inserted into mounting interfaces 402 arranged on the mounting base integrally formed with the gearbox, and the three PCBs are arranged in a triangular shape. As shown in FIG. 4, the PCBs 403 of the inverter circuit in the inverter of Patent Document 1 are assembled in a direction parallel to the input shaft of the gearbox (abbreviated as axial direction hereinafter), and after the inverter enclosure is sleeved over, the axial length of the inverter is certainly greater than the axial length of the PCBs 403, thus resulting in an excessive axial length of the inverter, and further causing an excessive overall axial length of the electric drive system. Furthermore, the three PCBs 403 are arranged in the triangular shape, whereas the inverter enclosure 400 is of a cylindrical shape, thus an unavailable space between the PCBs and the enclosure 400 is too large, which not only causes waste of the space, but also does not facilitate the construction of protective measures for damping the PCBs, or the like.

As shown in (b) of FIG. 2, the inverter unit according to an embodiment of the present invention mainly includes two layers of inverter circuit PCBs 101 and 102, and various electronic elements for achieving the function of the inverter are respectively mounted on the PCBs 101 and 102. Since the components of the inverter circuit and DC/AC conversion principle are not inventive points of the present invention, various principles and components of existing inverter circuits can be employed, and therefore a detail description thereof is omitted. The two layers of PCBs 101, 102 are arranged in a direction substantially perpendicular to the input shaft direction (abbreviated as axial direction hereinafter) of the gearbox unit 200, the PCB 101 close to the flange connection surface 106 of the inverter unit 100 and the enclosure of the inverter unit 100 as well as the PCBs are fixed to each other via multiple axially extending fixing posts 103. Thereby, the PCBs are fixed in a stacking manner into the enclosure of the inverter unit 100. Of course, the PCBs may not be connected and fixed to each other, but are respectively fixed to the enclosure of the inverter unit 100.

The enclosure of the inverter unit 100 is of the shape of a box which has a bottom face shape matching with the shape of a projection of the outer contour of the PCBs in the enclosure. In this embodiment, since the PCBs 101 and 102 are of a square shape, the enclosure of the inverter unit 100 is a box having a cuboid shape.

The PCBs 101, 102 of the inverter circuit assembled in the stacking manner have a total axial thickness smaller than the length and width of the PCBs themselves. Thus, by arranging the PCBs and their related elements in the inverter unit 100 in the above way, the axial length of the inverter unit 100 can be shortened, thus further shortening the overall axial length of the electric drive system. In addition, since the enclosure of the inverter unit 100 is of the shape of a box which has a bottom face shape matching with the shape of the projection of the outer contour of the PCBs in the enclosure, the internal space of the enclosure after the PCBs are assembled to the enclosure has a high utilization rate, and effective circuit board protective measures are easy to realize.

In addition, in the above embodiment, an example is described in which two inverter circuit PCBs are mounted in the inverter unit 100; however, the number of PCBs is obviously not limited to this, and there may also be only one PCB or more PCBs stacked, as long as it is ensured that the enclosure of the inverter unit 100 has a minimum thickness in the axial direction among the thicknesses in various directions.

Figure 5:
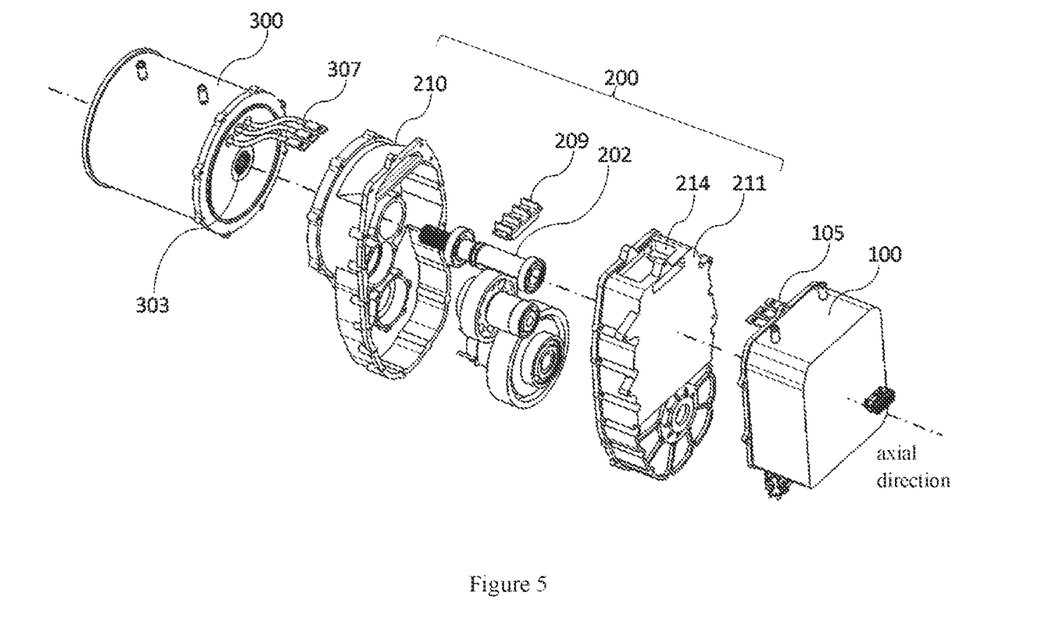
FIG. 5 is an exploded view schematically showing a relationship of an electric motor unit, a gearbox unit and an inverter unit according to an embodiment of the present invention when they are being assembled.

FIG. 5 is an exploded view schematically showing a relationship of the electric motor unit 300, the gearbox unit 200 and the inverter unit 100 according to this embodiment when they are being assembled. As shown in FIG. 5, the electric motor unit 300, the gearbox unit 200 and the inverter unit 100 are arranged in an axial direction (indicated by the single dot dashed line) of the input shaft 202 of the gearbox unit 200. The input shaft 202 of the gearbox unit 200 extends from an input shaft through hole of the enclosure 210 on the electric motor side and then extends into the output shaft 303 which is a hollow shaft of the electric motor unit 300, wherein the external splines of the input shaft 202 are cooperatively coupled with the internal splines in the output shaft 303 of the electric motor unit 300 so as to be rotated integrally with the output shaft 303. Meanwhile, the bus bars 307 of the electric motor unit 300 extend into the dry cavity of the gearbox unit 200, and after extending out of the window above of the partition plate of the enclosure 211 on the inverter side of the gearbox unit 200, enter the bus bar docking area 214 under the guidance of the insulation grids of the insulation block 209. Moreover, the flange connection surface of the inverter unit 100, which is substantially in parallel with the plane where the inverter circuit PCBs are located inside the inverter unit 100, is fixed to the enclosure 211 on the inverter side of the gearbox unit 200 by bolts in the axial direction of the input shaft 202 of the gearbox unit 200. Meanwhile, the bus bars 105 of the inverter unit 100 extend from the window of the enclosure 211 on the inverter side of the gearbox unit 200 into the docking area 214 so as to be stacked vertically with the bus bars 307 of the electric motor unit 300. Finally, the electric motor unit 300, the gearbox unit 200, the inverter unit 100 are fixed to each other by detachable mechanical or non-mechanical connection methods such as bolt connection or the like, thus constituting the electric drive system.

As compared with the transversely arranged compact electric drive system in the prior art such as Patent Document 1, the axial length of the compact electric drive system according to the present invention is further shortened. Therefore, it can be not only configured for front axles of a vehicle, but also can be configured for rear axles of the vehicle and serve as the drive system. As an example, a total axial length of the practical product of the compact electric drive system based on Patent Document 1 is approximately above 880 cm, and cannot meet the requirement on the mounting space for mounting the electric drive system at the vehicle rear axles where the assembling space is greatly limited. However, the compact electric drive system according to the present invention at least further shortens the axial length of the inverter unit, and therefore can control the overall axial length of the electric drive system to be approximately 700 cm. Therefore, the electric drive system having the same design can be not only mounted at the vehicle front axles, but also can be mounted at the vehicle rear axles, thereby achieving the four-wheel-drive requirements of the vehicle with a simple design and structure.

Furthermore, since the gearbox unit of the present application is provided with the dry cavity for insertion of the electric connection lines of the electric motor unit and the inverter unit, the connection lines of the electric drive system can be embedded into the enclosure, thereby preventing the electric connection line from being adversely affected by the external muddy water or the internal lubricating oil, and meanwhile, the electric drive system is made more concise as a whole, the interference from external wirings is reduced, and the insulation performance is ensured.

In addition, since the insulation block having the insulation grids are further provided at the docking area of the electric connection lines of the electric motor unit and the inverter unit according to the present application, the insulation performance between the electric connection lines can be increased. Furthermore, since the isolation effect of the insulation grids, it is not required for the electric connection lines to use the bus bars having a large thickness for ensuring the rigidity as the techniques disclosed in Patent Document 1, and the bus bars having a small thickness and a low rigidity can be employed, or a conductive material having a high conductivity and a low rigidity of itself can be used, thus increasing the freedom for design and material selection. Alternatively, a conventional harness with flexibility can be also used as an electric connection line; however, as compared with the conventional drive system which uses a harness to connect the inverter and the electric motor, the arrangement of the electric drive system according to the present application can shorten the connection harness, thereby significantly simplifying the system design, and greatly reducing the weight and the current loss between the inverter and the electric motor. In addition, in this embodiment, the way in which the inverter supplies a three-phase AC power to the electric motor via three bus bars is illustrated; however, the number of the bus bars is not limited to this, and two or more than three bus bars may also be provided according to the type of the electric motor.

In addition, the present application is not limited to the above embodiments and variations, and the constituent elements can be varied or embodied without departing from the scope of the technical idea. Various inventions can be formed by appropriately combining individual constituent elements disclosed in the above embodiments and variations. In addition, several constituent elements may also be deleted from all of the constituent elements shown in the above embodiments and variations.

What is claimed is:

1. An electric drive system for vehicle, comprising:
an inverter unit for converting DC power supplied from outside into AC power;
an electric motor unit for converting the AC power from the inverter unit into a mechanical rotation and outputting the mechanical rotation from an output shaft; and
a gearbox unit for decelerating the rotation transmitted from an input shaft and then outputting a decelerated rotation;
wherein the electric motor unit, the gearbox unit and the inverter unit have independent enclosures respectively, and are fixedly connected to each other in a detachable manner in such a way that the gearbox unit is sandwiched by the electric motor unit and the inverter unit in an axial direction of the input shaft of the gearbox unit, and the electric motor unit, the gearbox unit, and the inverter unit are transversely arranged in a straight line in the direction of the input shaft of the gearbox unit;

the enclosure of the inverter unit has a minimum thickness in the axial direction relative to length and width directions of the enclosure;

the inverter unit includes one or more layers of inverter circuit boards, and the inverter circuit boards are arranged with their circuit board surfaces substantially perpendicular to the axial direction;

a partition plate is provided in the gearbox unit for partitioning the interior of the gearbox unit into a gear transmission cavity and a dry cavity for insertion of electric connection lines of the electric motor unit and the inverter unit; and the dry cavity includes a docking area for docking of the electric connection lines of the electric motor unit and the inverter unit.

2. The electric drive system for vehicle according to claim 1, wherein the enclosure of the inverter unit is be of the shape of a box which has an outer shape matching with a projection shape of an outer contour of each of the circuit boards inside the enclosure.

3. A vehicle using the electric drive system for vehicle according to claim 2 as a front-wheel drive system.

4. The electric drive system for vehicle according to claim 1, wherein the electrical connection lines have multiple groups of connection wires;

an insulation block is provided in the docking area, and the insulation block is provided with insulation grids for insulating and isolating the groups of connection wires of the electric connection lines.

5. The electric drive system for vehicle according to claim 4, wherein the electrical connection lines are bus bars;

a bus bar of the electric motor unit and a bus bar of the inverter unit are stacked vertically at the docking area and are connected to each other in a detachable manner.

6. A vehicle using the electric drive system for vehicle according to claim 5 as a front-wheel drive system.

7. A vehicle using the electric drive system for vehicle according to claim 4 as a front-wheel drive system.

8. The electric drive system for vehicle according to claim 1, wherein the output shaft of the electric motor unit is a hollow shaft having internal splines;

the input shaft of the gearbox unit is a shaft extending from the enclosure of the gearbox unit and having external splines at a front end; and the input shaft of the gearbox unit is inserted into the output shaft of the electric motor unit, and its external splines are cooperatively coupled with the internal splines of the output shaft of the electric motor unit so that the input shaft of the gearbox unit rotates with the rotation of the output shaft of the electric motor unit.

9. A vehicle using the electric drive system for vehicle according to claim 8 as a front-wheel drive system.

10. A vehicle using the electric drive system for vehicle according to claim 1 as a front-wheel drive system.

11. The vehicle according to claim 10, further using the electric drive system for vehicle according to claim 1 as a rear-wheel drive system.

* * * * *